US012612967B1

(12) United States Patent
Lenaerts

(10) Patent No.: US 12,612,967 B1
(45) Date of Patent: Apr. 28, 2026

(54) SYSTEM AND METHOD FOR CLUTCH HEATING CONTROL

(71) Applicant: Dana Belgium N.V., Bruges (BE)

(72) Inventor: Nicolas Lenaerts, Bruges (BE)

(73) Assignee: DANA BELGIUM, Bruges (BE)

( * ) Notice: Subject to any disclaimer, the term of this patent is extended or adjusted under 35 U.S.C. 154(b) by 0 days.

(21) Appl. No.: 19/003,584

(22) Filed: Dec. 27, 2024

Related U.S. Application Data

(60) Provisional application No. 63/559,388, filed on Feb. 29, 2024.

(51) Int. Cl.
| | |
|---|---|
| *F16H 61/30* | (2006.01) |
| *F16D 48/06* | (2006.01) |
| *F16H 59/00* | (2006.01) |
| *F16H 59/36* | (2006.01) |
| *F16H 59/68* | (2006.01) |

(52) U.S. Cl.
CPC ............ *F16H 61/30* (2013.01); *F16D 48/06* (2013.01); *F16H 59/00* (2013.01); *F16H 59/36* (2013.01); *F16D 2500/10412* (2013.01);

*F16D 2500/30405* (2013.01); *F16D 2500/3065* (2013.01); *F16H 2059/6807* (2013.01)

(58) Field of Classification Search
CPC .. F16H 61/30; F16H 2059/6807; F16D 48/06; F16D 2500/10412; F16D 2500/30405; F16D 2500/50236
See application file for complete search history.

(56) References Cited

U.S. PATENT DOCUMENTS

| | | | |
|---|---|---|---|
| 4,425,992 | A | 1/1984 | Makita |
| 11,872,990 | B2 * | 1/2024 | Park ........................ F16H 61/12 |
| 2013/0324360 | A1 | 12/2013 | Saito et al. |
| 2017/0267240 | A1 | 9/2017 | Cho |

* cited by examiner

*Primary Examiner* — Huan Le
(74) *Attorney, Agent, or Firm* — McCoy Russell LLP

(57) ABSTRACT

A method and system for estimating a temperature of a clutch and a maximum temperature of a clutch are described. In one example, the maximum temperature of the clutch is based on phases of a transmission gear shift. The transmission gear shift may include a power-on downshift and a power-on upshift.

18 Claims, 7 Drawing Sheets

700

SYSTEM AND METHOD FOR CLUTCH HEATING CONTROL

CROSS REFERENCE TO RELATED APPLICATION

The present application claims priority to U.S. Provisional Application No. 63/559,388, entitled "SYSTEM AND METHOD FOR CLUTCH HEATING CONTROL", and filed on Feb. 29, 2024. The entire contents of the above-listed application are hereby incorporated by reference for all purposes.

TECHNICAL FIELD

The present disclosure relates to controlling heat of a clutch when applying and/or releasing the clutch. The clutch may be a clutch of a transmission, axle, or driveline.

BACKGROUND AND SUMMARY

A vehicle may include one or more clutches. The clutches may be part of a transmission, axle, or other powertrain device. During applying and releasing of a clutch, the clutch may slip and generate heat. If a temperature of the clutch exceeds a threshold temperature, the clutch may begin to exhibit degradation. Therefore, it may be desirable to constrain an amount of heat that may be generated via a clutch during application and/or releasing of the clutch.

The inventor here has recognized the above-mentioned issues and have developed a method for operating a clutch, comprising: via a controller, generating an estimate of a temperature of the clutch; generating a threshold temperature for the clutch based on phases of a gear shift; and adjusting operation of a device in response to the temperature difference between the estimated temperature of the clutch and the threshold temperature for the clutch.

By adjusting operation of a device in response to a temperature difference between the estimated temperature of the clutch and the threshold temperature for the clutch that is based on phases of a gear shift, it may be possible to reduce a possibility of generating excess clutch wear. In particular, a gear shift phase based clutch temperature threshold may allow clutch operation to be controlled according to how a clutch is being operated so that mitigating actions may be performed in a timely manner so that the possibility of clutch degradation may be reduced.

The present description may provide several advantages. In particular, the approach may reduce a possibility of clutch degradation. Further, the approach reduces the possibility of clutch overheating. In addition, the approach may provide increased control over clutch wear.

It may be understood that the summary above is provided to introduce in simplified form a selection of concepts that are further described in the detailed description. It is not meant to identify key features of the claimed subject matter, the scope of which is defined uniquely by the claims that follow the detailed description. Furthermore, the claimed subject matter is not constrained to implementations that solve any disadvantages noted above or in any part of this disclosure.

The accompanying drawings are incorporated herein as part of the specification. The drawings described herein illustrate embodiments of the presently disclosed subject matter, and are illustrative of selected principles and teachings of the present disclosure. However, the drawings do not illustrate all possible implementations of the presently disclosed subject matter, and are not intended to constrain the scope of the present disclosure in any way.

DETAILED DESCRIPTION

Figure 1:
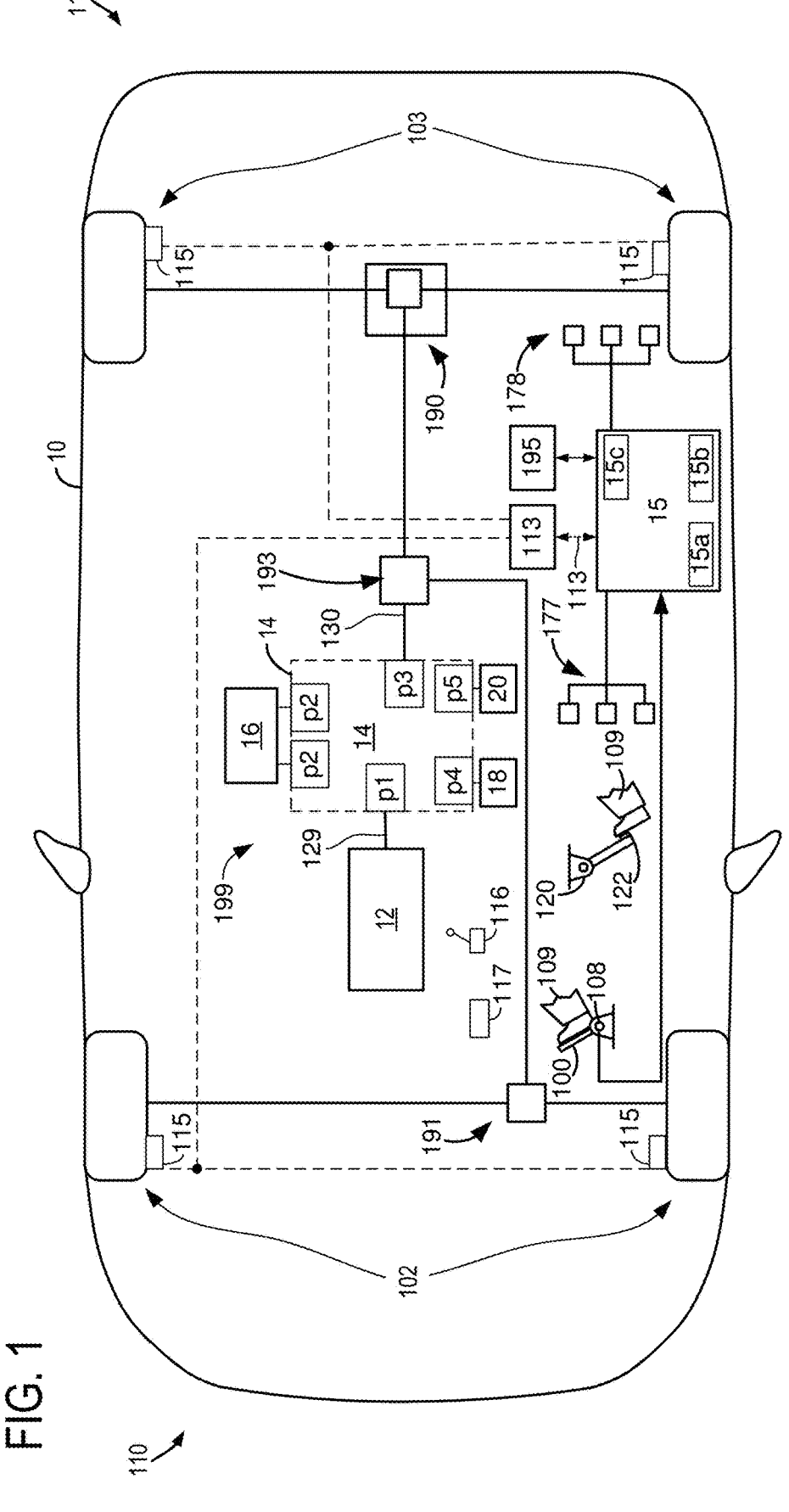
FIG. 1 is a schematic diagram of an example vehicle powertrain that includes a transmission.
Figure 4:
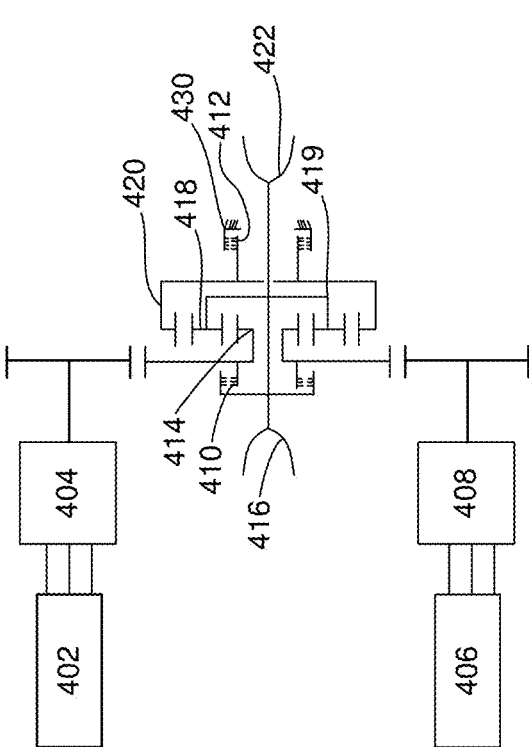
Figure 4:
Figure 5:
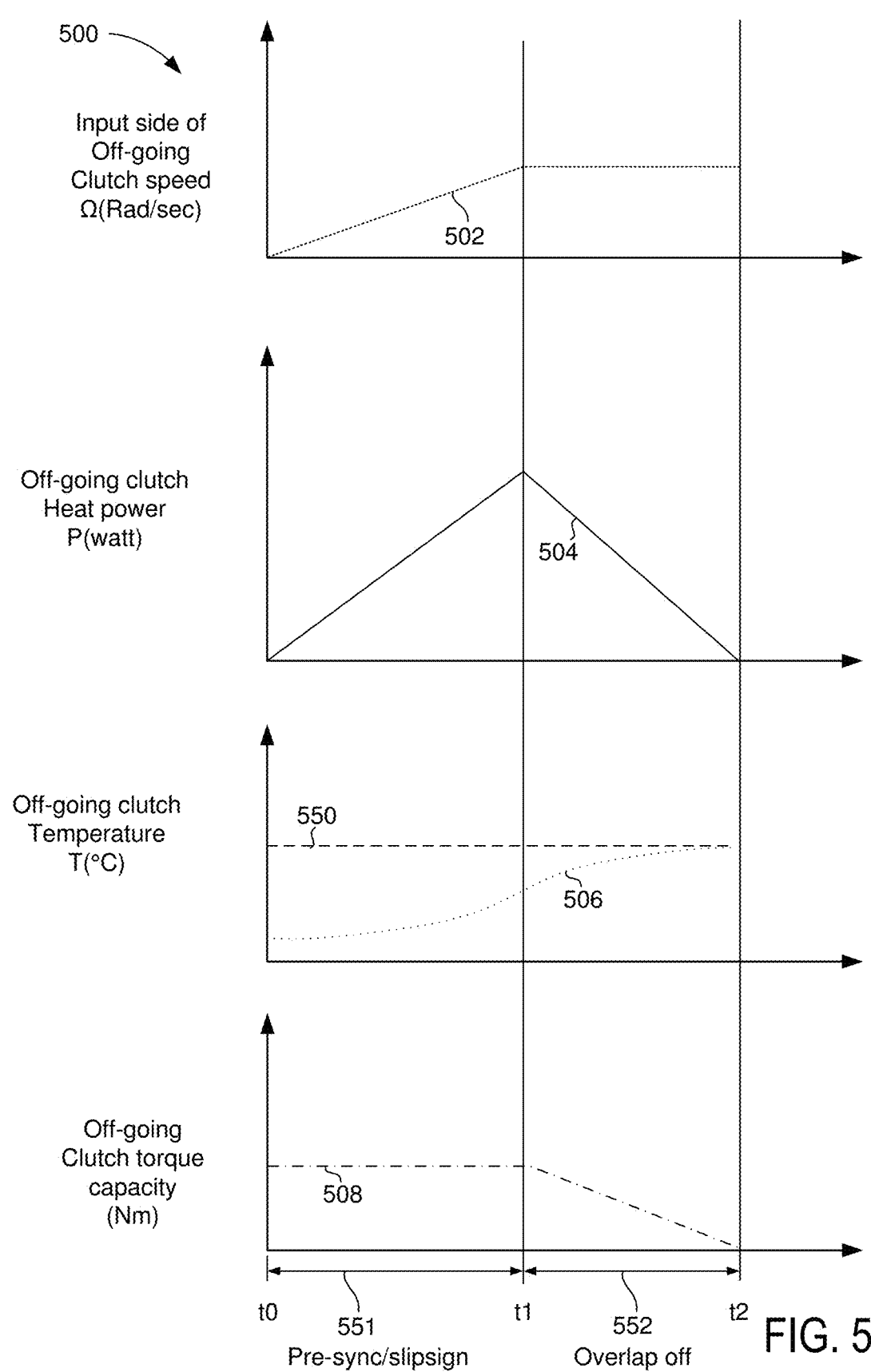
FIG. 5 shows an example of clutch operation where a clutch enters a pre-sync/slipsign phase before an overlap off phase.
Figure 6:
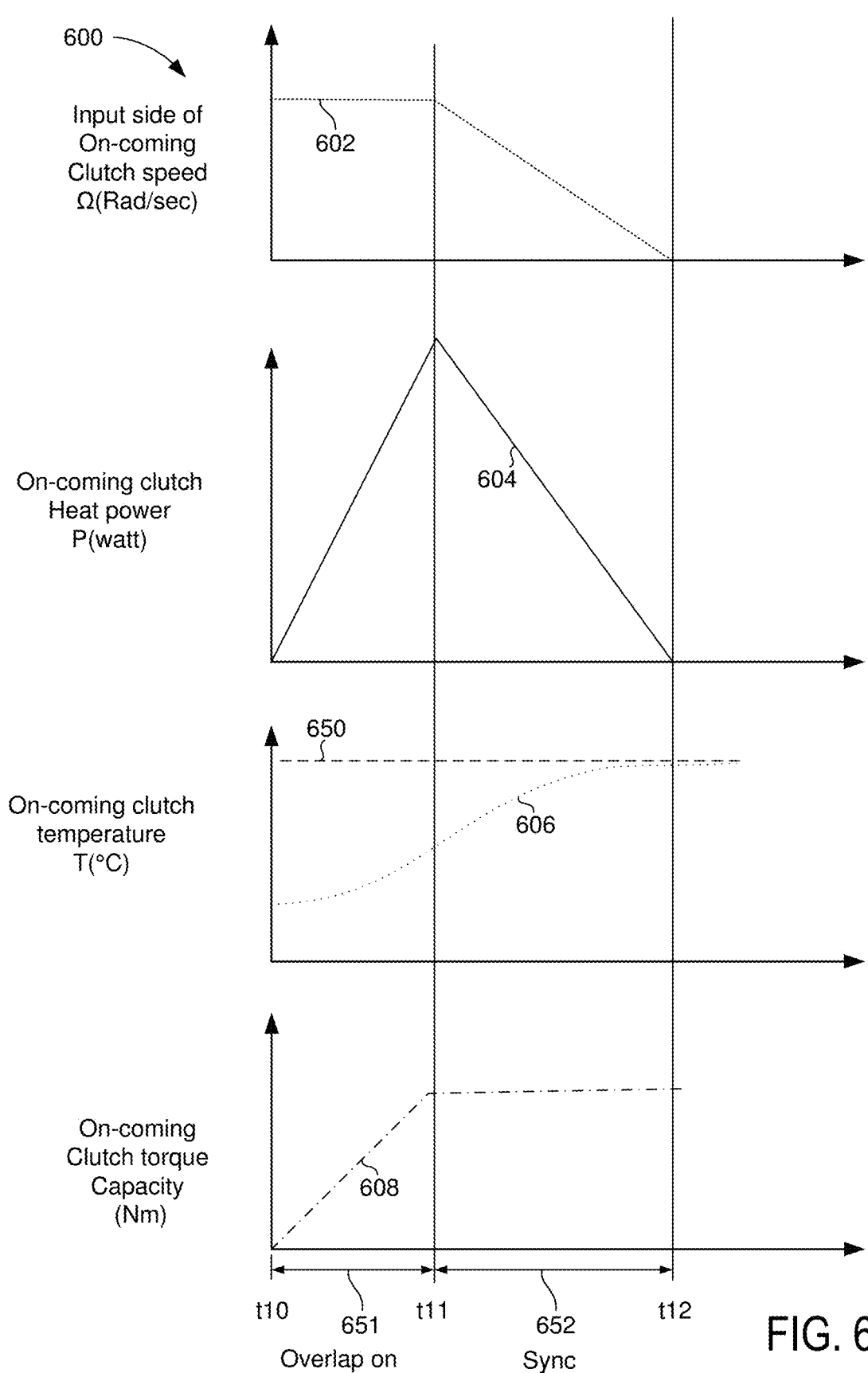
FIG. 6 shows an example of clutch operation where a clutch enters an overlap on phase before entering a synchronization phase.

The following description relates to systems and methods for constraining a temperature increase of a clutch so that a possibility of degrading the clutch may be reduced. The clutch may be a transmission clutch, an axle clutch, a driveline disconnect clutch or other known driveline clutch. The clutch may be included in a hybrid vehicle as shown in FIG. 1, or alternatively, in an electric vehicle or a vehicle that does not include an electric propulsion source. In some examples, the clutch may be incorporated in a transmission of one of the types shown in FIGS. 2-4. A temperature of a clutch may be estimated according to a clutch operating profile as illustrated in FIGS. 5 and 6. A clutch may be operated according to the method of FIG. 7.

FIG. 1 illustrates an example vehicle powertrain 199 included in vehicle 10. Vehicle 10 includes a front side 110 and a rear side 111. Vehicle 10 includes front wheels 102 and rear wheels 103. Vehicle 10 includes a torque source 12 (e.g., internal combustion engine or electric machine) that may selectively provide propulsive effort to front axle 191 and rear axle 190. In other examples, the torque source 12 may provide propulsive effort solely to front axle 191 or solely to rear axle 190. Torque source 12 is shown mechanically coupled to transmission 14 via transmission input shaft 129. In some examples, the engine's crankshaft (not shown) may be coupled to transmission input shaft 129. Transfer case 193 routes mechanical power from transmission output shaft 130 to front axle 191 and rear axle 190. A vehicle operator may select a particular transmission gear or vehicle operating mode via shifter 116. The vehicle's angle relative to horizontal ground may be determined via inclinometer 117.

Electric energy storage device 16 (e.g., a traction battery or capacitor) may provide electric power to electric machines included in transmission 14. Transmission 14 may supply mechanical power to mechanically driven accessories 18 and 20. Transmission 14 may be operated via controller 15. In this example, controller 15 is configured to command electric machines (not shown), clutches (not shown), and brakes (not shown) within transmission 14. Controller 15 may switch operating modes of transmission 14 via adjusting states of clutches and brakes. Controller 15 may also receive a position of a driver demand pedal 100 from driver demand pedal position sensor 108, which may be an input for determining the operating state of transmission 14. The driver demand pedal 100 and the driver demand pedal position sensor 108 may react to movement caused by human driver 109. Brake pedal 122 may be applied by human driver 109 and brake pedal sensor 120 provides an indication of brake pedal position to controller 15. Controller 15 may receive data from sensors 177. Sensors 177 may include, but are not constrained to a vehicle speed sensor, a transmission temperature sensor, transmission input shaft speed sensor, transmission output shaft speed sensor, wheel speed sensors, an inclinometer, and a shifter position sensor, and an ambient temperature sensor. Controller 15 may adjust operating states of the vehicle powertrain 199 via adjusting operating states of actuators 178. Actuators 178 may include but are not constrained to electric machines, inverters, clutch actuators for clutches (C0-C2), brake actuators for brakes (mid brake B1/low brake B2), and engine torque actuators (throttle, cams, fuel injectors, spark actuator). Controller 15 includes a processor 15a for executing instructions, read-exclusive memory 15b, and random access memory 15c. In this example, a single controller 15 is shown, but in other examples several controllers may operate together in a distributed system to perform the methods described herein. Controller 15 may receive input from and provide output to human/machine interface 195 (e.g., touch screen display, pushbuttons, etc.). Controller 15 may also communicate with friction brake controller 113 via controller area network 113. Friction brake controller 113 may selectively apply and release friction brakes 115 in coordination with instructions received from controller 15. Alternatively, additional or fewer controllers may be provided.

Figure 2:
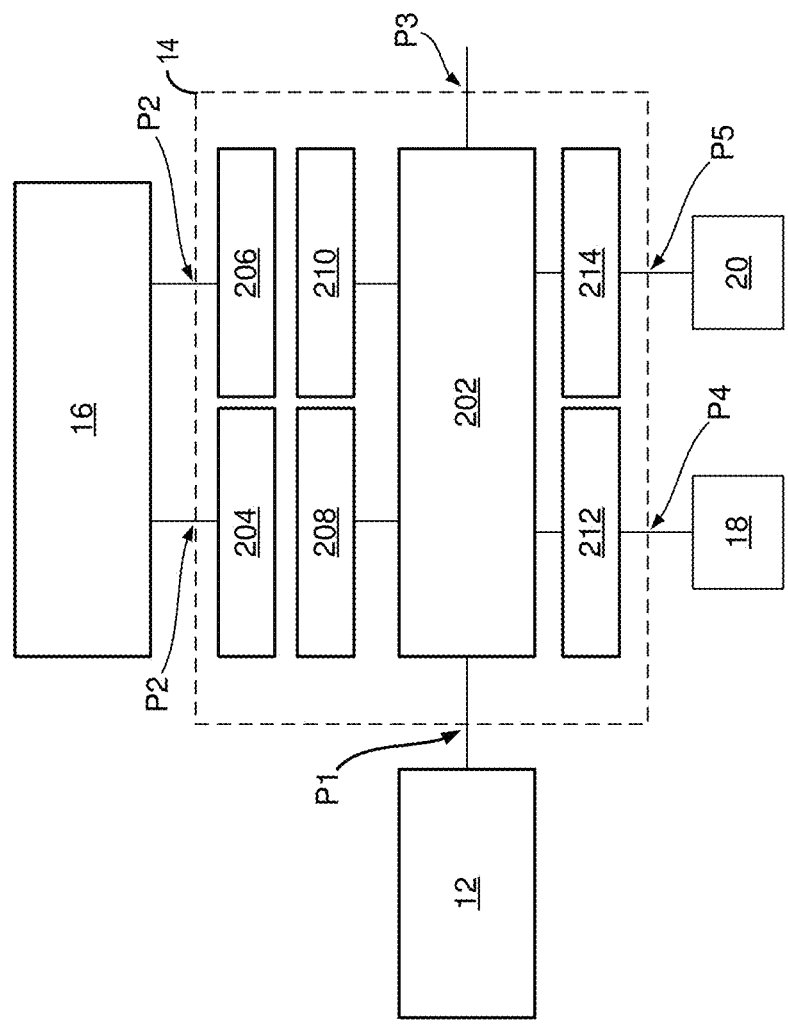
FIGS. 2-4 show diagrams of example transmissions.

Referring now to FIG. 2, a block diagram of transmission 14 is shown. Transmission 14 is shown with 5 ports that are labeled P1-P5. Port 1 (P1) is configured to receive mechanical energy from torque source 12 (e.g., internal combustion engine or electric machine). Alternatively, port 1 may deliver mechanical energy to external power source 12. Port 2 (P2) is a port that receives electrical power from electric energy storage device 16. Alternatively, port 2 may provide electrical power to electric energy storage device 1. Electrical ports 2 are shown directly electrically coupled to a first inverter 206 and a second inverter 204. First inverter 206 may convert direct current (DC) to alternating current (AC). AC may be delivered from first inverter 206 to first electric machine 210. Likewise, AC may be delivered from second inverter 204 to second electric machine 208. Alternatively, first and second electric machines 210 and 208 may deliver AC power to inverters 206 and 204. Electric machines 210 and 208 may supply mechanical power to gears, clutches, and brakes 202. As such, electric machines 210 and 208 may also be referred to as torque sources. Gears, clutches, and brakes 202 may transfer mechanical power to output ports P3-P5. Output port P3 may transfer mechanical power to wheels 103. Output port P4 may transfer mechanical power to power take off (PTO1) 212 and accessories 18, the accessories 18 not including vehicle wheels. Output port P5 may transfer mechanical power to power take off (PTO2) 214 and accessories 20, the accessories 20 not including vehicle wheels.

Figure 3:
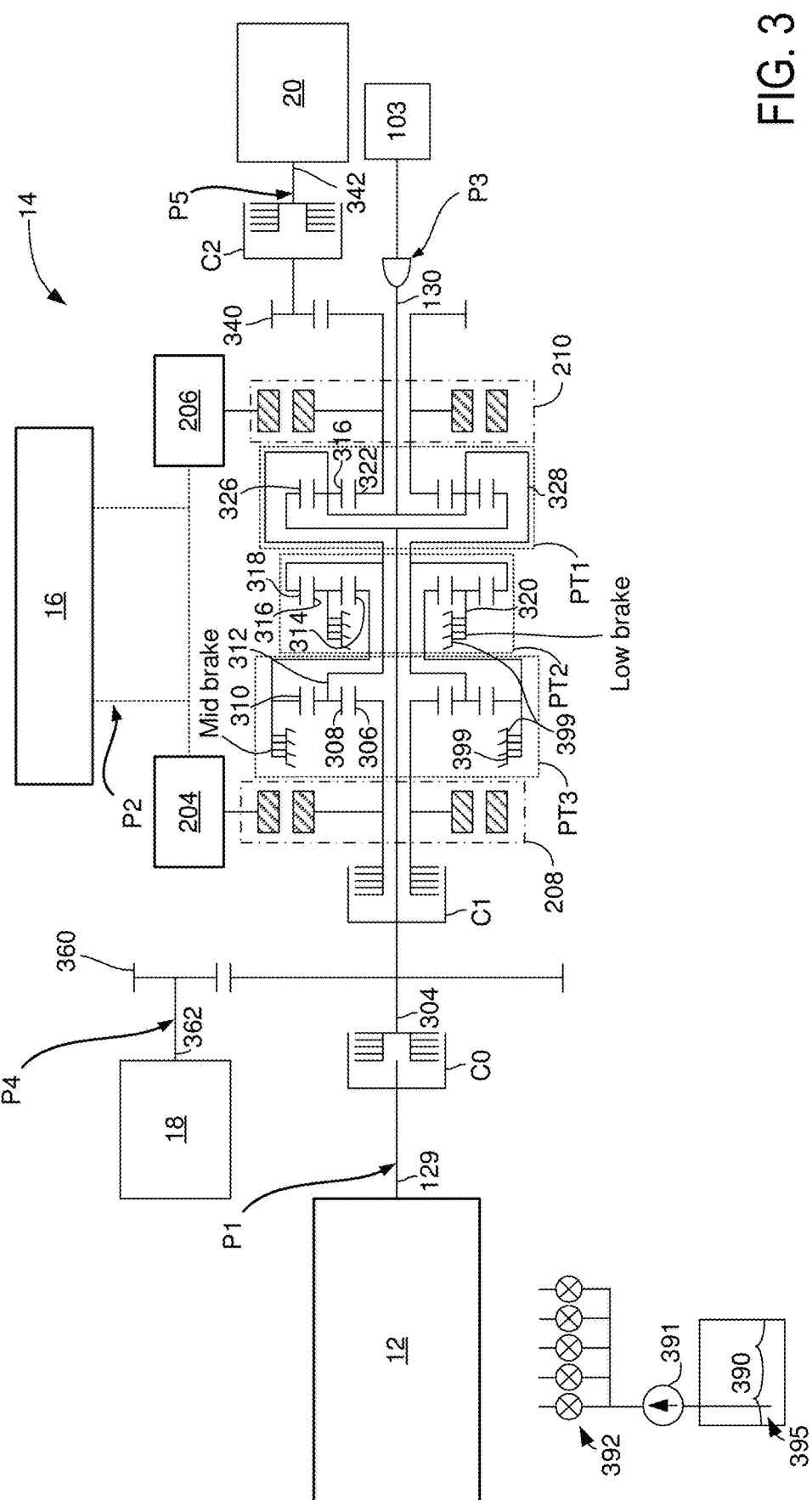

Turning now to FIG. 3, a detailed view of one example of transmission 14 is shown. In this example, torque source 12 is shown coupled to transmission input shaft 129. Transmission input shaft 129 is coupled to clutch C0 and clutch C0 may selectively couple transmission input shaft 129 to connecting shaft 304. Clutch C0 is directly coupled to ring gear 326 of first planetary gear set PT1 and PTO1 gear 360 via connecting shaft 304. PTO1 gear 360 may be coupled to accessories 18 via PTO1 shaft 362. First planetary gear set PT1 also includes planetary gears 316 and a sun gear 322. Sun gear 322 is shown coupled to PTO2 gear 340 and electric machine 210. Planetary gears 316 couple sun gear 322 to ring gear 326. Carrier 328 supports planetary gears

316. PTO2 gear 340 may be selectively coupled to PTO2 output shaft 342 via PTO2 clutch C2. PTO2 output shaft 342 may be directly coupled to accessories 20, and accessories 20 are not coupled to vehicle wheels.

Connecting shaft 304 may be selectively coupled to electric machine 208 and sun gear 306 of third planetary gear set PT3 via closing input coupled clutch C1. Sun gear 306 of third planetary gear set PT3 is coupled to planetary gears 308. Planetary gears 308 are coupled to ring gear 310, and planetary gears 308 are supported via carrier 312. Planetary gears 308 are coupled to ring gear 318 of second planetary gear set PT2 and planetary gears 316 of first planetary gear set PT1 via carrier 312 of third planetary gear set PT3 and carrier 328 of first planetary gear set PT1. Carrier 328 of first planetary gear set PT1 is coupled to wheels 103 via transmission output shaft 130. Mid brake B1 may be closed to ground or couple ring gear 310 of third planetary gear set PT3 to transmission case 399.

Second planetary gear set PT2 includes a sun gear 314 that is coupled to ring gear 310 of first planetary gear set PT1. Planetary gears 308 of second planetary gear set PT2 are coupled to sun gear 314 of planetary gear set PT2 and ring gear 318 of second planetary gear set PT2. Brake B2 may be closed to ground or couple carrier 320 of second planetary gear set PT2 to transmission case 399.

PTO1 is directly coupled to connecting shaft 304. Therefore, whenever connecting shaft 304 is rotating, PTO1 output shaft 362 rotates. PTO1 output shaft 362 may be rotated via closing clutch C0 when torque source 12 is rotating. PTO1 may also be rotated via electric machine 208 by closing clutch C1. PTO1 may rotate in any of the modes that are shown in the table of FIG. 4.

PTO2 may rotate and provide mechanical power to accessories 20 during three modes. In a hill hold mode, brakes mid brake B1 and low brake B2 may be closed to lock rotation of transmission output shaft 130 and PTO2 output shaft 342 may be rotated via torque generated via electric machine 210 and/or torque source 12. In this way, PTO2 output shaft 342 may rotate at a speed that is a multiple of a rotational speed of torque source 12 and connecting shaft 304.

PTO2 output shaft 342 may be rotated when clutch C1 is open, C2 is closed, and C0 is open or closed. PTO2 output shaft 342 may also provide mechanical torque to accessories 20 when brake mid brake B1 is open, low brake B2 is closed, C1 is open, C2 is closed and C0 is open or closed. Applying brake B2 prevents rotation of carrier 320 so that when torque source 12 or electric machine 208 drive the transmission output shaft 130 via connecting shaft 304, second planetary gear set PT2, and first planetary gear set PT1, PTO2 gear 340 may rotate. Energy may flow from torque source 12 to connecting shaft 304 via clutch C0, connecting shaft 304 may transfer torque to ring gear 326 causing planetary gears 316 to rotate along with sun gear 322 so that carrier 328 and transmission output shaft 130 may rotate. Rotating sun gear 322 allows PTO2 gear 340 to rotate. PTO2 output shaft 342 may rotate when clutch C2 is closed.

PTO2 output shaft 342 may also be rotated when clutch C1 is open, C2 is closed, and C0 is open or closed. PTO2 output shaft 342 may also provide mechanical torque to accessories 20 when brake mid brake B1 is closed, low brake B2 is open, C1 is open, C2 is closed and C0 is open or closed. Applying brake mid brake B1 prevents rotation of ring gear 310 and sun gear 306. Energy may flow from torque source 12 to connecting shaft 304 via clutch C0, connecting shaft 304 may transfer torque to ring gear 326 causing planetary gears 316 to rotate along with sun gear 322 so that carrier 328 and transmission output shaft 130 may rotate. Rotating sun gear 322 allows PTO2 gear 340 to rotate. PTO2 output shaft 342 may rotate when clutch C2 is closed.

Clutches and brakes of transmission 14 may be supplied with fluid 395 that is supplied by pump 391 from reservoir 390 by way of valves 392. A position of valves 392 and may be controlled via actuators 178 (e.g., valve actuators) to control flow of fluid to valves 392, clutches (C0-C2), and brakes.

Referring now to FIG. 4, one of several alternative transmission configurations that may benefit from the method disclosed herein is shown. Transmission 400 includes a first inverter 402 and a second inverter 406. First inverter 402 is directly electrically coupled to first electric machine 404. Second inverter 406 is directly electrically coupled to second electric machine 408. First electric machine 404 and second electric machine 408 may be powered by electric energy storage device 16 as shown in FIG. 1. In this example, controller 15 (e.g., as shown in FIG. 1) is configured to command first electric machine 404, second electric machine 408, a first clutch 410, and a first brake 412. The controller may switch operating modes of transmission 400 via adjusting states of clutches and brakes.

Transmission 400 includes a rear output shaft 416 and a front output shaft 422. Transmission also includes a planetary gear set 413 that includes a sun gear 414, planetary gears 418, carrier 419 that supports the planetary gears, and ring gear 420. First brake 412 may selectively couple ring gear 420 to transmission case 430. Rear output shaft 416 and front output shaft 422 are coupled to carrier 419 and first clutch 410. First clutch 410 may be closed to couple front output shaft 416 and rear output shaft 422 to sun gear 414, first electric machine 404 and second electric machine 408. Output shaft 422 and input shaft 416 may be locked by applying clutch 410 and first brake 412.

Figure 7:
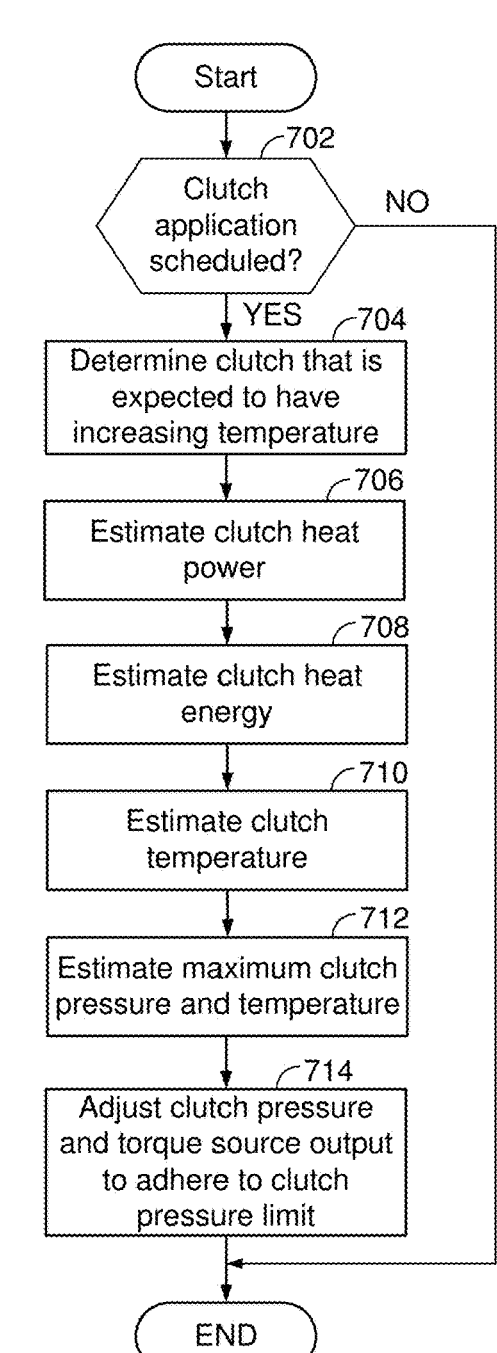
FIG. 7 shows a method for controlling a temperature of a clutch.

It may be appreciated that the transmissions of FIGS. 2-4 represent a mere fraction of transmissions in which the method of FIG. 7 may be applied. Further, the transmissions may be coupled to and/or include a variety of possible power sources.

Thus the systems of FIGS. 1-4 may provide for a vehicle system, comprising: one or more torque sources; a transmission including a plurality of gear clutches and gears; a controller including executable instructions that cause the controller to adjust a pressure supplied to one of the plurality of gear clutches in response to a temperature estimate of one of the plurality of gear clutches and a threshold temperature for the one of the plurality of gear clutches, where the threshold temperature is based on phases of a gear shift. In a first example, the vehicle system further comprises generating a threshold pressure based on a form factor for a clutch profile. In a second example that may include the first example, the vehicle system further comprises adjusting torque output of the one or more torque sources in response to a pressure change of the one of the plurality of gear clutches. In a third example that may include one or both of the first and second examples, the vehicle system includes where the phases of the gear shift include a pre-sync/slipsign phase and an overlap off phase. In a fourth example that may include one or more of the first through third examples, the vehicle system includes where the phases of the gear shift include an overlap on phase and a sync phase. In a fifth example that may include one or more of the first through fourth examples, the vehicle system further comprises additional executable instructions that cause the controller to determine phases of a scheduled gear shift. In a sixth example that may include one or more of the first through fifth examples, the vehicle system includes where the scheduled gear shift is an upshift or a downshift.

Referring now to FIG. 5, an off-going clutch profile for estimating clutch heat energy during a transmission gear shift is shown. The clutch profile of FIG. 5 may be applied according to the method of FIG. 7 to control a temperature of a clutch during a transmission gear shift. The clutch profile may be for a clutch that is included in the system of FIGS. 1-4. The plots of FIG. 5 are time aligned. In this example, the off-going clutch profile is for a power-on downshift.

The first plot from the top of FIG. 5 is a plot of off-going clutch rotational speed in units of radians per second versus time. The vertical axis represents rotational clutch speed and rotational clutch speed increases from zero at the level of the horizontal axis in the direction of the vertical axis arrow. The horizontal axis represents time and time increases from the left side of the plot to the right side of the plot.

The second plot from the top of FIG. 5 is a plot of off-going clutch heat power in units of watts versus time. The vertical axis represents off-going clutch heat power and off-going clutch heat power increases from zero at the level of the horizontal axis in the direction of the vertical axis arrow. The horizontal axis represents time and time increases from the left side of the plot to the right side of the plot.

The third plot from the top of FIG. 5 is a plot of off-going clutch temperature in units of degrees Celsius versus time. The vertical axis represents off-going clutch temperature and off-going clutch temperature increases from zero at the level of the horizontal axis in the direction of the vertical axis arrow. The horizontal axis represents time and time increases from the left side of the plot to the right side of the plot.

The fourth plot from the top of FIG. 5 is a plot of off-going clutch torque capacity in units of Newton-meters (Nm) versus time. The vertical axis represents off-going clutch torque capacity and off-going clutch torque capacity increases from zero at the level of the horizontal axis in the direction of the vertical axis arrow. The horizontal axis represents time and time increases from the left side of the plot to the right side of the plot.

At time t0, the gear shift is entering a pre-synch/slipsign phase where a rotational speed of the input of the off-going clutch is increased to match a rotational speed of the input and output side of the on-coming clutch. The speed of the off-going clutch may be increased by reducing its pressure, and thus torque capacity, to an intended maximum pressure, and increasing the torque applied to the input of the clutch, pulling it into slip. The heat power of the off-going clutch (e.g., second gear) is nearly zero, but it begins to increase shortly after time to as the off-going clutch begins to slip and torque output of the electric machine that provides torque input to the transmission increases. The temperature of the off-going clutch is lower at this time because the off-going clutch is closed and transferring torque with minimal losses. The torque capacity of the off-coming clutch is at a constant medium level.

Between time t0 and time t1, the electric machine increases the rotational speed of the off-going clutch. The off-going clutch heat power increases as the electric machine increases the speed of the off-going clutch by increasing its torque output. The temperature of the off-going clutch increases with the increasing rotational speed of the off-going clutch. The off-going clutch torque capacity is maintained at a constant medium level.

At time t1, the rotational speed of the input of the off-going clutch levels off to a constant medium level and the off-going clutch heat power reaches a peak value. The off-going clutch temperature continues to increase and the off-going clutch torque capacity begins to be reduced as the shift phase changes to an overlap off phase where the off-going clutch capacity begins to be lowered.

Between time t1 and time t2, the rotational speed of the off-going clutch is unchanged and the off-going clutch heat power continues to be reduced as the torque capacity of the off-going clutch decreases. Further, the temperature of the off-going clutch continues to increase and the torque capacity of the off-going clutch is reduced.

At time t2, the gear shift ends and the off-going clutch rotational speed is at a constant middle level. The off-going clutch heat power is reduced to zero and the off-going clutch temperature is held below the maximum clutch temperature 550. The off-going clutch torque capacity is reduced to zero.

Thus, in this example, the off-going clutch profile includes linear torque reduction and there is a linear speed increase in the off-going clutch speed. Further, the heat power of the off-going clutch is linear. The linear off-going clutch speed, linear off-going clutch torque capacity, and linear off-going clutch heat power may be the basis for estimating off-going clutch heat energy and off-going clutch temperature during a power-on downshift.

Referring now to FIG. 6, an on-coming clutch profile for estimating on-coming clutch heat energy is shown. The on-coming clutch profile of FIG. 6 may be applied according to the method of FIG. 7 to control a temperature of an on-coming clutch. The on-coming clutch profile may be for a clutch that is included in the system of FIGS. 1-4. The plots of FIG. 6 are time aligned. In this example, the on-coming clutch profile is for a power-on upshift.

The first plot from the top of FIG. 6 is a plot of on-coming clutch rotational speed in units of radians per second versus time. The vertical axis represents on-coming clutch rotational speed and on-coming clutch rotational speed increases from zero at the level of the horizontal axis in the direction of the vertical axis arrow. The horizontal axis represents time and time increases from the left side of the plot to the right side of the plot.

The second plot from the top of FIG. 6 is a plot of on-coming clutch heat power in units of watts versus time. The vertical axis represents off-going clutch heat power and off-going clutch heat power increases from zero at the level of the horizontal axis in the direction of the vertical axis arrow. The horizontal axis represents time and time increases from the left side of the plot to the right side of the plot.

The third plot from the top of FIG. 6 is a plot of on-coming clutch temperature in units of degrees Celsius versus time. The vertical axis represents on-coming clutch temperature and on-coming clutch temperature increases from zero at the level of the horizontal axis in the direction of the vertical axis arrow. The horizontal axis represents time and time increases from the left side of the plot to the right side of the plot.

The fourth plot from the top of FIG. 6 is a plot of on-coming clutch torque capacity in units of Newton-meters (Nm) versus time. The vertical axis represents on-coming clutch torque capacity and on-coming clutch torque capacity increases from zero at the level of the horizontal axis in the direction of the vertical axis arrow. The horizontal axis represents time and time increases from the left side of the plot to the right side of the plot.

At time t10, the gear shift is entering an overlap on phase where torque is transferred to the on-coming clutch. In this example, the torque transfer is linear. The heat power of the on-coming clutch increases as torque is transmitted to the on-coming clutch as the torque capacity of the on-coming clutch is increased. The temperature of the on-coming clutch begins to increase as the on-coming clutch slips and torque is transferred through the on-coming clutch. The torque capacity of the on-coming clutch begins to increase at time t10.

Between time t10 and time t11, the clutch torque capacity increases from 0 (open clutch) to a target clutch torque capacity. The on-coming clutch heat power increases as its torque capacity is increased with a constant slip speed.

At time t11, the rotational speed of the on-coming clutch is reduced and the shift enters a synchronization phase. The heat power of the on-coming clutch reaches a peak value and it declines after time t11. The temperature of the on-coming clutch continues to increase and the torque capacity of the on-coming clutch levels off.

Between time t11 and time t12, the rotational speed of the on-coming clutch is reduced and the heat power of the on-coming clutch is reduced to zero. The temperature of the on-coming clutch levels off to be less than threshold 650. The torque capacity of the on-coming clutch remains unchanged.

At time t12, the gear shift ends and the torque capacity of the on-coming clutch is constant. The on-coming clutch temperature ceases increasing and then gradually declines (not shown). The heat power of the on-coming clutch is zero.

Thus, in this example, the on-coming clutch profile includes a linear torque increase and there is a linear speed decrease in the on-coming clutch speed. Further, the heat power of the on-coming clutch is linear. The linear on-coming clutch speed, linear on-coming clutch torque capacity, and linear on-coming clutch heat power may be the basis for estimating maximum on-coming clutch heat energy and maximum on-coming clutch temperature during a power-on upshift.

Regarding FIGS. 5, pre-synchroizatin/slipsign phase is where speed synchronization of the off-going clutch (e.g., the clutch generating heat) occurs before torque is transferred to the target clutch. This gear shift phase may be initiated when the target clutch may not support the target clutch torque. This gear shift phase may be followed by the overlap off phase. Overlap off phase is a gear shift phase where torque transfer from a torque source to the target clutch occurs when speed of the target clutch is synchronized (e.g., when input speed of the target clutch matches output speed of the target clutch). Regarding FIG. 6, overlap on phase is where torque transfer to the target clutch is made while the target clutch is not speed synchronized. The synchronization phase is when speed of the target clutch is synchronized while the torque has been transferred to the target clutch.

Referring now to FIG. 7, a method for controlling temperature of a clutch is shown. The method of FIG. 7 may be applied to gear clutches, brakes, driveline disconnect clutches, etc. The method of FIG. 7 may be stored as executable instructions in non-transitory memory of a controller of a system as described in FIGS. 1-4. The controller may apply sensors and actuators to adjust operating states of the system according to the method of FIG. 7.

At 702, method 700 judges whether or not application of a clutch or brake is scheduled. A clutch may be scheduled to shift gears, close a disconnect clutch, etc. An application of a clutch may be based on a gear shift schedule, disconnect clutch closing schedule, etc. For example, if vehicle speed is increasing and the transmission is presently engaged in first gear, method 700 may judge that a shift to second gear is scheduled when vehicle speed is greater than a threshold speed when vehicle speed is increasing. During such conditions, an on-coming clutch may be applied and an off-going clutch may be released. If method 700 determines that application of a clutch or brake is scheduled, method 700 proceeds to 704.

At 704, method 700 evaluates each clutch that is active during a shift or other clutch operation. Depending on the shift type/phase progression the respective clutch pressure and clutch speed profiles are predicted, and the respective energy calculation and following maximum clutch pressure are determined. By applying a linear clutch torque and speed profile a general energy equation may be determined for the on-coming and off-going clutches. The clutch temperature evaluation starts when a particular gear shift or clutch application phase is reached. It may be noted that for a power-on downshift, as shown in FIG. 5, the temperature evaluation of the on-coming clutch starts beginning with the overlap phase and not during the pre-sync phase. By that time (when the overlap phase starts), the on-coming clutch is already synchronized. Thus, the clutch temperature evaluation will indicate that almost no energy will be generated in the on-coming clutch for the remainder of the shift and that no (aka a very high and not relevant) pressure threshold will be reached. The situation is vice-versa for the off-going clutch during a power-on upshift. Method 700 may determine the clutch that is expected to generate heat by referencing a table that outputs which clutch is expected to be heated during a scheduled clutch application according to the type of gear shift that is pending (e.g., upshift, downshift, etc.). Further, method 700 may determine phases of the gear shift according based on a table or function that outputs gear shift phases for a particular type of gear shift. For example, method 700 may output pre-sync/slipsign and overlap off for a power-on upshift as shown in FIG. 5. Similarly, method 700 may determine overlap on and synch phases for a power-on upshift as shown in FIG. 6 according to table or function output. Method 700 proceeds to 706.

At 706, method 700 estimates a clutch heat power for the clutch that is generating heat. In one example, method 700 may determine the clutch heat power according to the following equation:

$$\text{Clutchhp} = T \cdot d\omega$$

where Clutchhp is the clutch heat power of the clutch that is generating heat, T is the present torque capacity for the clutch that is generating heat (e.g., the amount torque that the clutch may transfer), and do is the differential speed across the clutch that is generating heat (e.g., clutch input speed-clutch output speed). Method 700 proceeds to 708.

At 708, method 700 estimates the clutch's heat energy. In one example, the heat energy of the clutch that is generating heat may be estimated by the following equation:

$$E = \int \text{Clutchhp} \cdot dt - ca(\text{clutchtemp} - \text{sumptemp})$$

where E is the estimated heat energy of the clutch that is generating heat, Clutchhp is the clutch heat power, dt is a differential with respect to time, ca is a convection area of the clutch that is generating heat, clutchtemp a temperature of fluid in the clutch that is generating the heat, and sumptemp is a temperature of fluid in a sump that holds fluid for actuating the clutch that is generating heat. Method 700 proceeds to 710.

At 710, method 700 estimates the clutch temperature of the clutch that is generating heat. In one example, method 700 estimates the clutch temperature of the clutch that is generating heat according to the following equation:

$$\text{Clutchtemp} = E/\text{Clutchhc}$$

where Clutchtemp is the clutch temperature in degrees kelvin (K), E is the estimated heat energy of the clutch in joules (J), and Clutchhc is the clutch heat capacity in J/K. Method 700 proceeds to 712.

At 712, method 700 estimates the maximum allowed pressure and temperature of the clutch that is generating heat. In one example, method 700 applies a prophetic differential speed and torque profile for the clutch that is generating the heat. FIGS. 5 and 6 show two linear clutch profile application examples, one for an on-coming clutch and the other for an off-going clutch. The maximum clutch heat energy may be determined via the following equation:

$$Emax = \int \text{Clutchhp} \cdot dt = \text{Clutchhp} \cdot dt\_\text{shift} \cdot \left(\frac{1}{2}\right)$$

where Emax is the maximum clutch heat energy, Clutchhp is the clutch heat power of the clutch that is generating heat, dt is a differential with respect to time, dt_shift is the remaining phase time in a gear shifting phase or clutch application phase, and ½ is a form factor that may be tunable or adjustable for deviations of the clutch torque/differential speed profile or other factors. It may be appreciated that other clutch profiles and integration intervals may be applied to represent torque and differential speed shapes.

The maximum clutch temperature may be determined via the following equation:

$$\text{Clutchtempmax} = Emax/\text{Clutchhc}$$

where Clutchtempmax is the maximum temperature for the clutch that is generating the heat during the shift or clutch application, Emax is the maximum clutch heat energy for the clutch that is generating the heat, and Clutchhe is the clutch heat capacity.

For a pre-sync/slipsign gear shift as shown in FIG. 5, the maximum clutch temperature and maximum clutch pressure may be determined via the following equations:

$$T\_max = d\text{Temp}\_max * C * \text{FormFactor}/((d\omega\_act + d\omega\_tgt) * dt\_preSync + d\omega\_tgt * dt\_overlapOff$$

$$Prs\_max = (d\text{Temp}\_max * C * \text{FormFactor}/\text{pres2} Trq)/ ((d\omega\_act + d\omega\_tgt) * dt\_preSync + d\omega\_tgt * dt\_overlapOff$$

For a sync gear shift as shown in FIG. 6, the maximum clutch temperature and maximum clutch pressure may be determined via the following equations:

$$T\_max = d\text{Temp}\_max * C * \text{FormFactor}/d\omega\_act - T\_act * dt\_overlapOn/dt\_overlapOn + dt\_sync$$

$$Prs\_max = (d\text{Temp}\_max * C * \text{FormFactor}/d\omega\_act - T\_act * dt\_overlapOn)/(\text{pres2} Trq * (dt\_overlapOn + dt\_sync))$$

where dTemp_max: [Kelvin] is a difference between maximum allowed clutch temperature and the actual clutch temperature, C is heat capacity of the clutch that is generating the heat, FormFactor: [-] is a ratio which defines the form of the power and/or diff speed profile (e.g., for the example of linear changing torque and diff speed, this is 2 (results from integrating the power equation with a triangular profile)); dω_act: [rad/see] actual differential speed of the clutch (e.g., input speed-output speed of the clutch); dω_tgt: [rad/see] target (or expected) differential speed of the clutch at the end of the shift (e.g., input speed-output speed of the clutch); dt_preSync: [sec] amount of time left of pre-sync (aka slipsign) phase; dt_overlapOff: [sec] amount of time left of the overlap phase; dt_sync: [sec] is an amount of time left in the sync phase; prs2Trq: [Nm/bar] is a ratio from clutch plate pressure to clutch plate torque. Method 700 proceeds to 714.

At 714, method 700 constrains heating of the clutch that is generating heat. In one example, method 700 constrains pressure of fluid within the clutch that is generating heat. For example, the pressure within the clutch generating heat is constrained to be less than the maximum clutch pressure, thereby constraining the maximum clutch temperature. The controller react to the maximum clutch pressure and saturate/apply a clutch pressure of the clutch that is being heated to be equal to or less than this maximum pressure. The maximum clutch pressure results in a maximum clutch torque capacity for the clutch that is being heated. As such, this constraint imposes a maximum torque over the node in the mechanical system. The controller will also react to this respective maximum clutch torque capacity and saturate/ adapt the other torque set points to be in line. By way of a simplified example: If a clutch is determined to be limited to a maximum 2 bar pressure, with a pressure2Torque value of 100 Nm/bar, the clutch pressure control will be limited to 2 bar, and the torque source (if connected directly) will be limited to 200 Nm (2 bar*100 Nm/bar). Thus, torque input to the clutch by a torque source may be constrained or reduced during a gear shift as a function of the potentially reduced clutch pressure in the clutch that is generating heat. Similarly, charging and discharging of traction batteries may be constrained as a function of the reduced clutch pressure in the clutch that is generating heat. Method 700 proceeds to exit.

Thus, method 700 estimates clutch temperature and maximum temperature for the clutch according to a clutch profile so that clutch over temperature may be prevented and wear may be reduced. Further, the clutch temperature measurements are a function of the type of gear shift sequence that is performed so that clutch temperature may be more closely related to how the clutch is being operated so as to increase the clutch temperature estimate.

The method of FIG. 7 provides for a method for operating a clutch, comprising: via a controller, generating an estimate of a temperature of the clutch; generating a threshold pressure for the clutch based on phases of a gear shift; and adjusting operation of a device in response to the threshold pressure. In a first example, the method includes where the threshold pressure is a maximum clutch pressure. In a second example that may include the first example, the method includes where the device is a torque source and where torque output of the torque source is reduced. In a third example that may include one or both of the first and second examples, the method includes where the device is the clutch and where pressure within the clutch is reduced. In a fourth example that may include one or more of the first through third examples, the method includes where the estimate of the temperature of the clutch is based on a torque capacity of the clutch, and further comprising adjusting operation of the device in further response to the temperature of the clutch. In a fifth example that may include one or more of the first through fourth examples, the method includes where the estimate of the temperature of the clutch is further based on a rotational speed of the clutch and further comprising generating a threshold clutch pressure from the estimate of the temperature of the clutch and the threshold clutch temperature. In a sixth example that may include one or more of the first through fifth examples, the method includes where the estimate of the temperature of the clutch is further based on integrating a heat power of the clutch. In a seventh example that may include one or more of the first through fifth examples, the method includes where generating the threshold pressure is further based on a form factor of a clutch profile.

The method of FIG. 7 also provides for a method for operating a clutch, comprising: via a controller, integrating a variable over phases of a gear shift to generate a threshold temperature for the clutch; and adjusting operation of a device in response to a temperature of the clutch and the threshold temperature for the clutch. In a first example, the method includes where the variable is heat power of the clutch. In a second example that may include the first example, the method includes where the heat power is based on a torque capacity of the clutch. In a third example that may include one or both of the first and second examples, the method includes where the heat power is further based on a rotational speed of the clutch. In a fourth example that may include one or more of the first through third examples, the method includes where the device is the clutch.

Note that the example control and estimation routines included herein can be used with various powertrain and/or vehicle system configurations. The control methods and routines disclosed herein may be stored as executable instructions in non-transitory memory and may be carried out by the control system including the controller in combination with the various sensors, actuators, and other engine hardware. Further, portions of the methods may be physical actions taken in the real world to change a state of a device. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the examples described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller. One or more of the method steps described herein may be omitted if desired.

It will be appreciated that the configurations and routines disclosed herein are exemplary in nature, and that these specific examples are not to be considered in a constrained sense, because numerous variations are possible. For example, the above technology can be applied to powertrains that include different types of torque sources including different types of electric machines and transmissions. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims may be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for operating a clutch, comprising:
via a controller, generating an estimate of a temperature of the clutch;
generating a threshold pressure for the clutch based on phases of a gear shift, wherein the threshold pressure is a maximum clutch pressure; and
adjusting operation of a device in response to the threshold pressure.

2. The method of claim 1, where the device is a torque source and where torque output of the torque source is adjusted.

3. The method of claim 1, where the device is the clutch and where pressure within the clutch is reduced.

4. The method of claim 1, where the estimate of the temperature of the clutch is based on a torque capacity of the clutch, and further comprising adjusting operation of the device in further response to the temperature of the clutch.

5. The method of claim 4, where the estimate of the temperature of the clutch is further based on a rotational speed of the clutch.

6. The method of claim 5, where the estimate of the temperature of the clutch is further based on integrating a heat power of the clutch.

7. The method of claim 6, where generating the threshold pressure is further based on a form factor of a clutch profile.

8. A vehicle system, comprising:
one or more torque sources;
a transmission including a plurality of gear clutches and gears;
a controller including executable instructions that cause the controller to:
adjust a pressure supplied to the one of the plurality of gear clutches in response to a temperature estimate of the one of the plurality of gear clutches and a threshold temperature for the one of the plurality of gear clutches, where the threshold temperature is based on phases of a gear shift; and
determine phases of a scheduled gear shift.

9. The vehicle system of claim 8, further comprising generating a threshold pressure based on a form factor for a clutch profile.

10. The vehicle system of claim 8, further comprising adjusting torque output of the one or more torque sources in response to a pressure change of the one of the plurality of gear clutches.

11. The vehicle system of claim 8, where the phases of the gear shift include a pre-sync/slipsign phase and an overlap off phase.

12. The vehicle system of claim 8, where the phases of the gear shift include an overlap on phase and a sync phase.

13. The vehicle system of claim 2, where the scheduled gear shift is an upshift or a downshift.

14. A method for operating a clutch, comprising:
via a controller, integrating a variable over phases of a gear shift to generate a threshold temperature for the clutch; and
adjusting operation of a device in response to a temperature of the clutch and the threshold temperature for the clutch.

15. The method of claim 14, where the variable is heat power of the clutch.

16. The method of claim 15, where the heat power is based on a torque capacity of the clutch.

17. The method of claim 15, where the heat power is further based on a rotational speed of the clutch.

18. The method of claim 14, where the device is the clutch.

* * * * *